United States Patent
Emperle et al.

(10) Patent No.: US 11,113,099 B2
(45) Date of Patent: Sep. 7, 2021

(54) METHOD AND APPARATUS FOR PROTECTING A PROGRAM COUNTER STRUCTURE OF A PROCESSOR SYSTEM AND FOR MONITORING THE HANDLING OF AN INTERRUPT REQUEST

(71) Applicant: Robert Bosch GmbH, Stuttgart (DE)

(72) Inventors: Alexander Emperle, Balingen (DE); Jo Pletinckx, Sersheim (DE); Jan Scheuing, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 15/738,423

(22) PCT Filed: May 4, 2016

(86) PCT No.: PCT/EP2016/060010
§ 371 (c)(1),
(2) Date: Dec. 20, 2017

(87) PCT Pub. No.: WO2016/206847
PCT Pub. Date: Dec. 29, 2016

(65) Prior Publication Data
US 2018/0181433 A1 Jun. 28, 2018

(30) Foreign Application Priority Data
Jun. 22, 2015 (DE) .................... 10 2015 211 458.9

(51) Int. Cl.
*G06F 9/48* (2006.01)
*G06F 13/24* (2006.01)
(Continued)

(52) U.S. Cl.
CPC ............ *G06F 9/4831* (2013.01); *G06F 9/321* (2013.01); *G06F 9/327* (2013.01); *G06F 9/4812* (2013.01);
(Continued)

(58) Field of Classification Search
CPC .... G06F 9/4831; G06F 9/321; G06F 11/3024; G06F 13/24; G06F 11/1608; G06F 9/4812; G06F 9/327; G06F 11/1637
(Continued)

(56) References Cited

U.S. PATENT DOCUMENTS 3,905,023 A * 9/1975 Perpiglia .................... G06F 1/26
714/6.2
5,136,595 A 8/1992 Kimura
(Continued)

FOREIGN PATENT DOCUMENTS

JP 63-208130 A 8/1988
JP 7-64822 A 3/1995
(Continued)

OTHER PUBLICATIONS

Wikipedia "interrupt" page retrieved from https://en.wikipedia.org/wiki/Interrupt. (Year: 2019).*
(Continued)

*Primary Examiner* — Yair Leibovich
(74) *Attorney, Agent, or Firm* — Maginot, Moore & Beck LLP

(57) ABSTRACT

A processor system comprises at least a program counter structure, an interrupt control device, a memory, and an apparatus. The interrupt control device is configured to respond to an interrupt request by providing the program counter structure with an address associated with the interrupt request. The program counter structure is configured to output the address to the memory via a memory interface. The apparatus is configured to protect the program counter structure in case of an interrupt request, the apparatus includes an interface, a comparing device, and an outputting device.

10 Claims, 3 Drawing Sheets

(51) Int. Cl.
*G06F 9/32* (2018.01)
*G06F 11/30* (2006.01)
*G06F 11/16* (2006.01)
*G06F 11/00* (2006.01)

(52) U.S. Cl.
CPC ........ *G06F 11/004* (2013.01); *G06F 11/1608* (2013.01); *G06F 11/1637* (2013.01); *G06F 11/3024* (2013.01); *G06F 13/24* (2013.01)

(58) Field of Classification Search
USPC .......................................................... 714/15
See application file for complete search history.

(56) References Cited

U.S. PATENT DOCUMENTS

| | | | | |
|---|---|---|---|---|
| 5,511,184 | A * | 4/1996 | Lin | G06F 21/567 |
| | | | | 710/261 |
| 6,536,034 | B1 * | 3/2003 | Nassor | G06F 8/66 |
| | | | | 710/22 |
| 6,996,677 | B2 * | 2/2006 | Lee | G06F 12/1441 |
| | | | | 711/132 |
| 7,509,639 | B2 * | 3/2009 | Worley, Jr. | G06F 9/468 |
| | | | | 713/164 |
| 10,102,161 | B2 * | 10/2018 | Mitsuishi | G06F 13/24 |
| 2010/0036987 | A1 * | 2/2010 | Streett | G06F 9/3802 |
| | | | | 710/269 |
| 2010/0131801 | A1 | 5/2010 | Baleani et al. | |
| 2011/0078408 | A1 * | 3/2011 | Ishida | G06F 21/572 |
| | | | | 711/216 |
| 2014/0122937 | A1 * | 5/2014 | Shin | G06F 11/3636 |
| | | | | 714/38.13 |

FOREIGN PATENT DOCUMENTS

| | | |
|---|---|---|
| JP | 2011-154459 A | 8/2011 |
| WO | 2013/136114 A1 | 9/2013 |

OTHER PUBLICATIONS

Wikipedia "interrupt vector table" p. retrieved from https://en.wikipedia.org/wiki/Interrupt_vector_table (Year: 2019).*
International Search Report corresponding to PCT Application No. PCT/EP2016/060010, dated Jul. 6, 2016 (German and English language document) (5 pages).

* cited by examiner

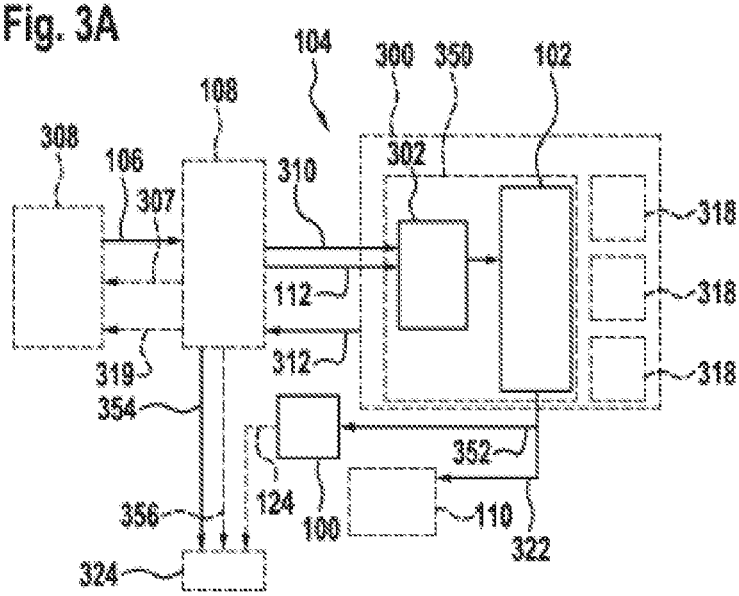
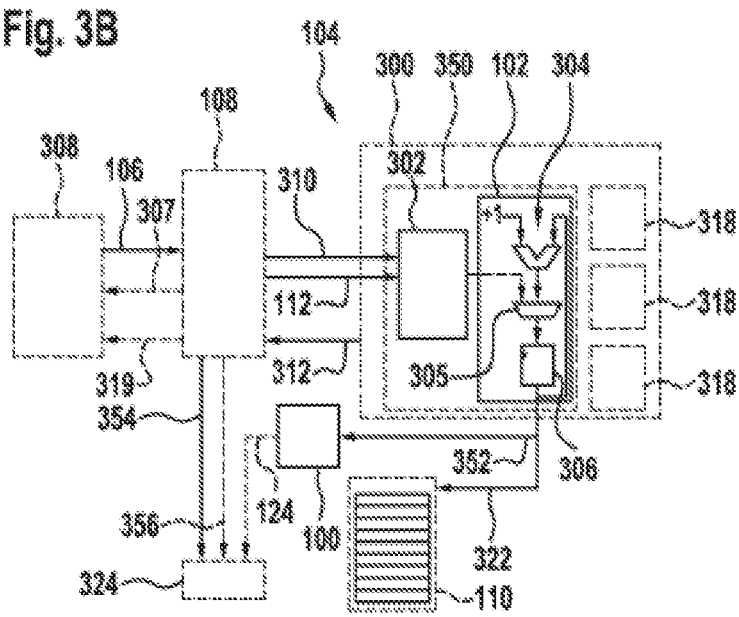

METHOD AND APPARATUS FOR PROTECTING A PROGRAM COUNTER STRUCTURE OF A PROCESSOR SYSTEM AND FOR MONITORING THE HANDLING OF AN INTERRUPT REQUEST

This application is a 35 U.S.C. § 371 National Stage Application of PCT/EP2016/060010, filed on May 4, 2016, which claims the benefit of priority to Serial No. DE 10 2015 211 458.9, filed on Jun. 22, 2015 in Germany, the disclosures of which are incorporated herein by reference in their entirety.

BACKGROUND

The disclosure is based on an apparatus or a method of the generic type of the independent claims. A computer program is also the subject of the disclosure.

Processors often allow the regular program sequence to be interrupted from outside by so-called interrupt requests (IRQs), in order to give preference to executing another important task, possibly even a time-critical task. Important here are observance of the interruption priority and successful execution of the interrupt routine associated with the interrupt request (interrupt service routine, ISR).

WO 2013 136 114 A1 describes a system that allows the monitoring of interrupts occurring and their correct processing by an interrupt controller (ICO).

SUMMARY

Against this background, the approach that is set out here presents a method for protecting a program counter structure of a processor system in the case of an interrupt request, a method for monitoring handling of an interrupt request, and also an apparatus that uses this method and finally a corresponding computer program as claimed in the main claims. Advantageous developments and improvements of the apparatus specified in the independent claim are possible by the measures recited in the dependent claims.

Especially for applications where safety is critical, it is important to detect errors in the handling of the interrupt requests.

Responding to an interrupt request, it can be detected from an address that is processed by a processor whether or not there is an error. Correctness can in this case be shown by a comparison with a reference address, since the memory location at which the address of the interrupt routine, known as the interrupt vector, is stored, or the interrupt routine itself is stored, is known.

A method for protecting a program counter structure of a processor system in the case of an interrupt request is presented, the processor system comprising at least the program counter structure, an interrupt control device and a memory, the interrupt control device being designed to respond to the interrupt request by providing the program counter structure with an address associated with the interrupt request, and the program counter structure being designed to output an address via a memory interface with respect to the memory, the method having the following steps:
reading in an address from the memory interface;
comparing the address with a target address assigned to the interrupt request, in order to obtain a comparison result; and
providing a match signal by using the comparison result.

The address described above may be the address at which the interrupt vector, the starting address of an interrupt routine or else the interrupt routine itself is stored. The first is typically required when using interrupt vector tables, so that this address is in the area of the interrupt vector table. For simplicity, reference will be made from now on to the address, even if both the address of the interrupt routine and the address of the interrupt vector itself may be used. What is important in each case is the address that is applied to the memory and is used for checking.

In this way, an address can already be read in from the memory interface and compared in the comparing step before or during the performance of the first command of an interrupt routine.

In a signaling step, a successful beginning of the processing of the interrupt request by using the match signal is signaled. This serves for protecting the program counter structure, since the correct initiation of the interrupt routine associated with the interrupt request can be checked. In addition, this can also be used for monitoring the handling of interrupt requests. Thus, for example, for monitoring the observance of the priority of these interrupt requests or else as part of monitoring the correct execution of the interrupt routine associated with the interrupt request (interrupt service routine).

The program counter structure may be designed to provide the memory interface with the subsequent address that logically follows the address. In the reading-in step, the subsequent address can then be additionally, or else exclusively, read in. Then, in the comparing step, the subsequent address can be compared with the subsequent target address that logically follows the target address, in order to obtain the comparison result. The subsequent address may refer to a memory location in the memory at which an item of information that is completely independent of the interrupt request is stored. A subsequent target address can be obtained simply by applying a logical operation of the program counter structure to the target address. Therefore, like the target address, the subsequent target address is always known and may be stored in the apparatus. By checking the subsequent address processed by the program controller structure after the address, the program counter structure can be monitored with great certainty. The program counter in this case can even be monitored with still greater certainty, since the structures/modules that are necessary for generating the subsequent address are protected.

The target address or the subsequent target address may be read in and verified by monitoring. Both the target address and the subsequent target address are known. For example, the target address may be an address from the interrupt vector table at which the address of the interrupt routine is stored. The subsequent target address may be for example the target address +1, which is generated by incrementing and is possibly generated in any case during normal operation.

A method for monitoring handling of an interrupt routine comprises the following steps:
performing the steps of a stated method for protecting a program counter structure; and
monitoring the handling of the interrupt request by using the match signal.

This makes it possible for the program counter structure to be monitored as part of the monitoring of the handling of interrupt requests. Thus, for example, for monitoring the observance of the priority of the interrupt requests or else as part of a monitoring of the correct execution of the interrupt routine associated with the interrupt request.

These methods may for example be implemented in software or hardware or in a mixed form of software and hardware, for example in a control unit.

An apparatus for protecting a program counter structure of a processor system in the case of an interrupt request is also presented, the processor system comprising at least the program counter structure, an interrupt control device and a memory, the interrupt control device being designed to respond to the interrupt request by providing the program counter structure with an address associated with the interrupt request, and the program counter structure being designed to output an address via a memory interface with respect to the memory, the apparatus having the following features:

an interface for reading in an address from the memory interface;

a comparing device for comparing the address with a target address assigned to the interrupt request, in order to obtain a comparison result; and an outputting device for providing a match signal by using the comparison result.

In the present case, an apparatus may be understood as meaning an electrical unit that processes sensor signals and, in dependence on them, outputs control and/or data signals. The apparatus may have an interface, which may take the form of hardware and/or software. Taking the form of hardware, the interfaces may for example be part of a so-called system ASIC, which comprises a wide variety of functions of the apparatus. It is also possible however that the interfaces are dedicated integrated circuits or at least partially consist of discrete components. Taking the form of software, the interfaces may be software modules, which are for example present on a microcontroller along with other software modules.

A processor system with at least an interrupt control device, a program counter structure, a memory and an apparatus for protecting the program counter structure according to the approach set out here is also presented, the interrupt control device being designed to respond to the interrupt request by providing the program counter structure with an address associated with the interrupt request, and the program counter structure being designed to output an address to a memory interface with respect to the memory, and the apparatus being designed to read in an address from the memory interface, to compare an address with a target address assigned to the interrupt request and to provide a match signal by using a comparison result of the comparison.

The program counter structure may be part of a processor core, which along with the program counter structure comprises an electronic arithmetic and logic unit and/or further other modules. However, the monitoring modules are independent of the processor itself and may in principle also be used in conjunction with a known processor architecture. The latter could take place for example by simply reading in the memory address, without the processor having to be modified.

The processor system may be realized as an integrated circuit. In this case, it may be a programmable integrated circuit, a so-called programmable IC.

Also of advantage is a computer program product or computer program with a program code, which may be stored on a machine-readable carrier or storage medium such as a semiconductor memory, a hard drive memory or an optical storage medium and is used for carrying out, implementing and/or activating the steps of the method according to one of the embodiments described above, in particular when the program product or program is run on a computer or an apparatus.

BRIEF DESCRIPTION OF THE DRAWING

Exemplary embodiments of the disclosure are explained in more detail in the description that follows and are represented in the drawings, in which:

FIG. 3*a* shows a representation of a processor system according to an exemplary embodiment of the disclosure;

FIG. 3*b* shows a representation of a processor system according to an exemplary embodiment of the disclosure;

DETAILED DESCRIPTION

In the description that follows of favorable exemplary embodiments of the disclosure, the same or similar designations are used for the elements that are presented in the various figures and act in a similar way, without the description of these elements being repeated.

Figure 1:
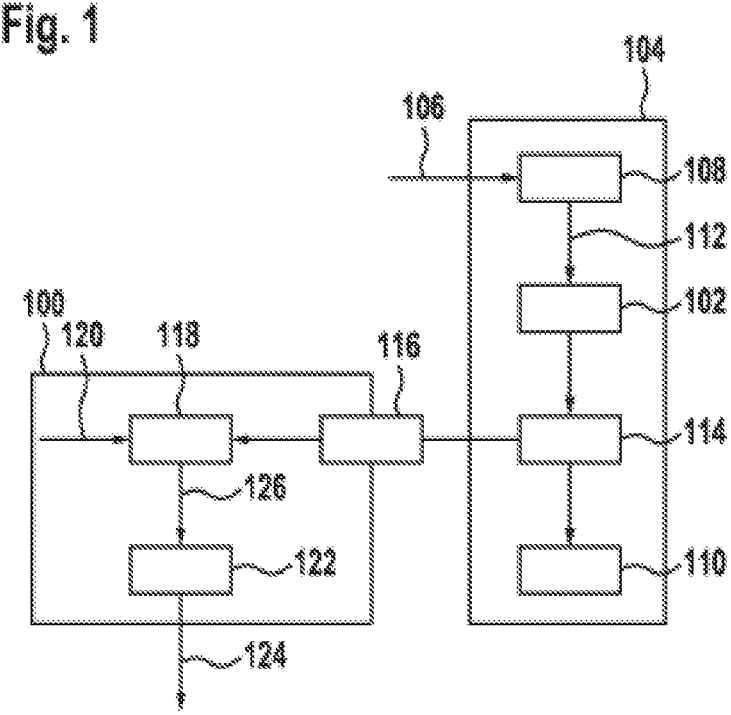
FIG. 1 shows a block diagram of a protecting apparatus according to an exemplary embodiment of the disclosure.

FIG. 1 shows a block diagram of an apparatus 100 for protecting a program counter structure 102 of a processor system 104 in the case of an interrupt request 106 according to an exemplary embodiment of the disclosure. Here, the processor system 104 comprises at least the program counter structure 102, an interrupt control device 108 and a memory 110. The interrupt control device 108, also known as an interrupt controller, is designed to respond to what is generally referred to as an interrupt request 106 by providing the program counter structure 102 with an address 112 associated with the interrupt request 106. The program counter structure 102 is designed to output the address 112 or a subsequent address via a memory interface 114 with respect to the memory 110.

The apparatus 100 has an interface 116 for reading in the address 112 or the subsequent address from the memory interface 114, a comparing device 118 for comparing the address 112 or the subsequent address with a target address 120 assigned to the interrupt request 106 and an outputting device 122. In this case, the outputting device 122 is designed to provide a match signal 124 by using a comparison result 126, provided by the comparing device 118, between the target address 120 and the read-in address 112 or the subsequent address.

By comparing the address 112 or the subsequent address with the target address 120, the program counter structure 102 can be checked, since it can be assumed that the program counter structure 102 is functioning as intended if the address 112 or the subsequent address is correctly transmitted by the various subsystems of the program counter structure 102.

Generally, the method presented is also suitable for monitoring and protecting the handling of interrupts of programmable ICs 104 that provide an interrupt mechanism.

Figure 2:
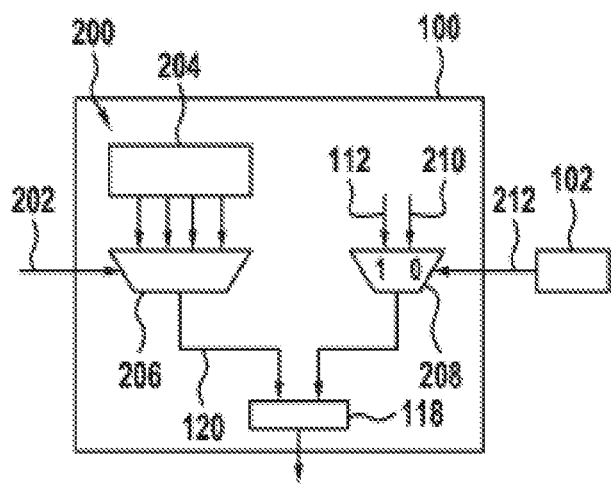
FIG. 2 shows a representation of a protecting apparatus according to an exemplary embodiment of the disclosure.

FIG. 2 shows a representation of a protecting apparatus 100 according to an exemplary embodiment of the disclosure. According to an exemplary embodiment, an ongoing, parallel comparison of the read-in address with all the theoretically valid target addresses or subsequent target addresses that are associated with interrupt requests can be carried out.

In a further exemplary embodiment, a comparison of the target address 120 and the actually applied address 112 is only initiated if an interrupt request has previously occurred. The same and/or further signals may be additionally used to select the corresponding comparison constant 204, in order thereby to reduce the number of comparisons performed at the same time. This may represent a more favorable implementation with respect to power consumption.

Merely by way of example, FIG. 2 shows the latter exemplary embodiment, in which the apparatus 100 has a device 200 for generating the target address 120. The target address 120 is selected in the generating device 200. This takes place by using an item of identification information 202 of the interrupt request, which in turn controls a multiplexer 206. For this purpose, the generating device 200 has a memory 204 for comparison constants. In one embodiment, the memory 204 is hard-wired. The target address 120 is provided for the comparing device 118.

The apparatus 100 also has a further multiplexer 208, which has as input signals the address 112, an error value 210 and, for control, a trigger signal 212. The trigger signal 212 may for example be provided by the program counter structure 102 whenever the address 112 is actually to be checked. Consequently, the address 112 to be checked is available for the comparing device 118 whenever the trigger signal 212 enables the input of the further multiplexer 208. Otherwise, the error value 210 is provided, and is certain to cause an incorrect comparison result in the comparing device 118. In this exemplary embodiment, a positive comparison result can therefore only be obtained whenever the address 112 to be checked is relevant and in addition also matches the interrupt request.

An item of identification information 202 that identifies the last-accepted interrupt request to select the corresponding comparison constant 204 may be used here in an energy-efficient way of implementing the comparison logic 100 for an implementation of the concept that is represented in FIG. 1. In this case, the comparison constant 204 represents a theoretical value of the target address or of the subsequent target address for the respective interrupt request. The trigger signal 212, generated for example by the state machine in the program counter module, may be used to initiate a check. Here, the error value 210 represents an address that is not part of the set of theoretically possible target addresses or subsequent target addresses, for example zero.

FIG. 3a shows a representation of a processor system 104 according to an exemplary embodiment of the disclosure. The processor system 104 corresponds substantially to the processor system in FIG. 1. Here, the program counter 102 is part of a processor 300, and in particular part of a control unit 350, which along with the program counter 102 has at least a state automaton 302.

The interrupt control device 108, also known as an interrupt controller, the memory 110 and the protecting apparatus 100 are arranged outside the processor core 300. According to this exemplary embodiment, the apparatus is designed to carry out an address comparison.

An external module 308 is designed to provide an interrupt request 106 to the interrupt control device 108 and optionally also to receive a confirmation of receipt 307 and a completion signal 319 from the interrupt control device 108. The interrupt control device 108 is designed to provide the state automaton 302 with a starting signal 310 and an address 112 and to receive an interrupt code 312 from the processor 300. The program counter 102 is designed to receive a signal from the state automaton 302 and to provide the memory 110 and the apparatus 100 with an address 352. This address 352 may be for example an address vector in the sense of an interrupt vector, or else however the address at which it is stored. The apparatus 100 is designed to compare the address 352 with a target address and, depending on the comparison, to provide an interrupt request monitoring unit 324 with a match signal 124. The interrupt request monitoring unit 324 is designed to receive along with the match signal 124 from the interrupt control device 108 an interrupt request monitoring signal 354 and a completion monitoring signal 356.

In FIG. 3a, a representation of the processor 300 with a control unit 350 and a program counter 102 as part of the same is shown.

The interrupt code 312 may be used by the interrupt control unit 108 to generate a completion monitoring signal 356 and also a completion signal 319, which do not have to be of the same type.

The interrupt code 312 may be used here to confirm the successful execution of an interrupt routine, for example for monitoring the handling of interrupt requests. The interrupt code 312 may be generated here by HW, for example by the program counter 102, or alternatively also on the basis of software, for example by the output of corresponding data via a port at the end of an interrupt routine.

The confirmation of receipt 307, signaled to the external module, and also the completion signal 319 are optional in principle and do not have to be of the same type as the corresponding signals that are made available to the monitoring unit. For example, the completion signal 319 may be generated on the basis of the interrupt code signal 312, or else the interrupt code 312 may be used directly.

The possible addresses, the target address or subsequent target address, that can be used for the comparison or the checking are not represented explicitly.

Since the address comparison 100 is not necessarily dependent on internal signals of the processor, it can in principle also be used for supplementing the monitoring of existing processes.

The way in which the program counter 102 is implemented here is immaterial for the approach described. Just the proportion of structures of the program counter that can be monitored may vary according to the implementation of the program counter. The configuration that is shown below on the basis of FIG. 3b should therefore be understood as being merely by way of example.

FIG. 3b shows a representation given merely by way of example of a processor system 104 according to an exemplary embodiment of the disclosure. The processor system 104 corresponds substantially to the processor system in FIG. 3a. Here, too, the program counter structure 102 is part of a processor core 300. The program counter structure 102 consists at least of an adder structure 304, a multiplexer 305 and a program counter register 306.

The interrupt control device 108, the memory 110 and the protecting apparatus 100 are arranged outside the processor core 300.

If an interrupt request 106 is sent by a module 308 generating the request to the interrupt control device 108, the interrupt request 106 is categorized by the interrupt control device 108 and processed according to its priority. When an interrupt is initiated, the interrupt control device 108 sends a starting signal 310 to the state automaton 302 and optionally also a confirmation of receipt 307 to the generating module 308. In addition, the address is output by the interrupt control device 108 to the state automaton 302, which then makes it available for the program counter register 306. At the beginning of the processing of the interrupt, the address 112 is thus selected by the multiplexer 305, under the control of the state automaton 302, and the corresponding address is written into the program counter register 306. In this way, an address 352 of the memory 110 is selected by the program counter register 306. At the address 352 in the memory 110 there may be stored for example an interrupt vector, the address of the first command of the interrupt routine, or else however the routine itself.

Between the memory 110 and the program counter 306, the address 352 is picked off by the protecting device 100.

The processing of the interrupt request begins at the address 352 for example with a jump to the first command of the routine itself or else already directly with the execution of the routine. During or after the ending of the interrupt routine, successful execution is finally signaled by the interrupt code 312 to the interrupt control device. On the basis of this code, the successful execution of the interrupt routine is then also signaled to the monitoring unit 324, and also optionally to the generating module 308.

The computing units 318 may include arithmetical-logical units and similar modules that are typically used in processors.

In an exemplary embodiment, the address 112 that is in the program counter register 306 is fed once again to the adder structure 304. In this case, the subsequent address is generated on the basis of the address 112. The address 112 is in this case for example incremented by plus one, in order to generate the subsequent address. The stated incrementation by 1 is only chosen here by way of example. This subsequent address is then written again into the program counter register 306 and subsequently applied to the memory 110.

Between the memory 110 and the program counter 306, the subsequent address is consequently picked off by the protecting apparatus 100. In the protecting apparatus 100, the match signal 124 is then also determined by using a comparison of the subsequent address with the subsequent target address.

In the case of the approach set out here, critical parts of the processor 300 are incorporated in the monitored structures, in order to increase the degree of coverage of the monitoring of interrupt requests. In addition to the correct passing on of the interrupt request 106 to the processor 300, parts of the handling of the interrupt request 106 are checked here by the processor 300.

Thus, the state automaton 302 is monitored, and also the adder structure 304, the multiplexer 305 and the program counter register 306.

The interrupt request monitoring signal 354, the completion monitoring signal 356 and also the match signal 124 may be evaluated in an interrupt request monitoring unit 324, in order to monitor the handling of interrupt requests. Not only the priority and the sequence of the execution of various requests but also the correct sequence during the execution of a request in itself can be monitored here.

In other words, a simplified representation of the concept for interrupt monitoring with additional monitoring of parts of the program counter module 102 is shown in FIG. 3b.

With less hardware expenditure, it can therefore be monitored without duplication and comparison whether for example temporary, constant, priority-related or similar errors occur in the processing of interrupts.

Typically present as part of the control unit is a state automaton 302, which controls the program sequence and the execution of different types of command. The state automaton 302 is in this case responsible inter alia for the correct sequence in the case of a present interrupt request 106. If the interrupt request 106 is present, an address 112 associated with the interrupt request 106 is generated at the next possible point in time at which an interrupt may take place, for example in the address area of an interrupt vector table, and the data stored at this location are read. These data may in turn be for example an interrupt vector for the address at which the interrupt routine itself is stored. The interrupt vector table may be stored here in memories of various types, such as for example ROM or RAM.

A checking of the call-up of the address 112 in the address area of the interrupt vector table, by comparison with the target address theoretically associated with this interrupt, is used for the purpose of checking the actual interruption of the regular program sequence, and consequently parts of the state automaton 302 within the program counter 102, and also the generation and application of the correct address to the memory 110, and consequently the initiation of the interrupt routine matching the interrupt request 106.

The approach set out here also describes a protection that goes further than that. If the interrupt vector table is in a memory 110 addressed by the program counter 102 that is for example activated in a clocked manner, as is typically the case with processors 300 with a pipeline, the then-following subsequent address can be additionally, or else exclusively, applied to the memory. In this way, the adder structure 304 in the program counter 102 that is used for incrementing the program counter register can thus be additionally checked, as well as the program counter register 306 in itself, by successful overwriting twice with correct data that are different from one another, and also further parts of the state automaton 302 that controls the program flow can be checked on the basis of the incrementing that has taken place of the program counter register 306, and also the multiplexer 305 that selects the input of the program counter register 306 can be checked. In this case, the multiplexer is first tested by correct switching to address 112 and subsequently to the adder output or the subsequent address.

Within the scope of the configurations, the subsequent address is the logically following address, irrespective of the manner of counting, such as for example linear or gray, of the program counter. The latter has no influence on the proposed concept, since the respectively corresponding target addresses are always known.

Figure 4:
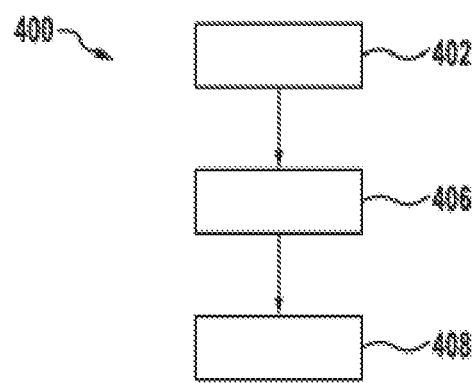
FIG. 4 shows a flow diagram of a protecting method according to an exemplary embodiment of the disclosure.

FIG. 4 shows a flow diagram of a method 400 for protecting a program counter structure of a processor system in the case of an interrupt request according to an exemplary embodiment of the disclosure. The method can be performed on an apparatus as represented for example in FIGS. 1 to 3. In this case, the processor system has at least the program counter structure, an interrupt control device and a memory. The interrupt control device is designed to respond to the interrupt request by providing the program counter structure with an address associated with the interrupt request. The program counter structure is designed to output an address via a memory interface with respect to the memory. The method 400 has a reading-in step 402, a comparing step 406 and a providing step 408. In the reading-in step 402, an address is read in from the memory interface. In the comparing step 406, the address is compared with a target address assigned to the interrupt request, in order to obtain a comparison result. In the providing step 408, a match signal is provided by using the comparison result.

In other words, a monitoring of the program counter structure in the case of the occurrence of interrupt requests is presented. This may in addition also be used for monitoring the handling of interrupt requests with protection of the program counter structure.

Figure 5:
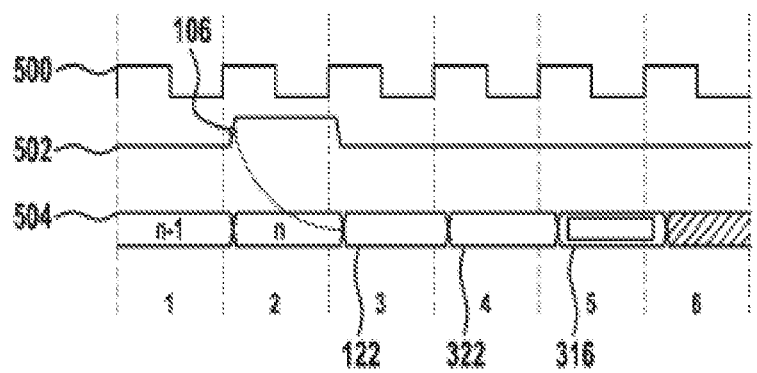
FIG. 5 shows a representation of a sequence when protecting an interrupt routine according to an exemplary embodiment of the disclosure.

FIG. 5 shows a representation of a time sequence of signals 500, 502, 504 when protecting an interrupt routine according to an exemplary embodiment of the disclosure merely as one possibility for implementation that is given by way of example. The first signal 500 is a clock signal. Timing with the rising signal edge for six successive clock pulses is presented as an example. Signal 504 represents the content of the program counter register 306. Assuming that in clock pulse two there is an interrupt request 502, which can be processed after reading in the commands at the addresses n and n−1, it is already possible in clock pulse three for the program counter register to be written for example with the address 122 of the interrupt vector 316. In this exemplary embodiment, this address of the interrupt vector is also the address that is applied to the memory and is checked by the address comparison 100. As a result, the successful initiation of the corresponding interrupt routine can be monitored.

If the program counter module is designed such that the subsequent address 322 is also applied to the memory in clock pulse 4, this can be checked additionally, or else exclusively, and consequently a greater part of the program counter structure can be monitored.

In clock pulse 5, finally, the interrupt vector 316, and consequently the address of the first command of the monitoring routine, is written into the program counter register and applied to the memory and execution of the routine itself is begun.

In other words, FIG. 5 shows a timing diagram given by way of example to illustrate the sequence when initiating the interrupt routine. If an interrupt request 106 occurs, its processing is initiated by the processor. Subsequently, the addresses 122 and 322 that can be used for interrupt checking are applied.

If an exemplary embodiment comprises an "and/or" conjunction between a first feature and a second feature, this should be read as meaning that, according to one embodiment, the exemplary embodiment comprises both the first feature and the second feature and, according to a further embodiment, the exemplary embodiment comprises either only the first feature or only the second feature.

The invention claimed is:

1. A method for protecting a program counter structure of a processor system in case of an interrupt request, the processor system comprising at least the program counter structure, an interrupt control device, and a memory, the method comprising:
   responding to the interrupt request with the interrupt control device by providing the program counter structure with an address associated with the interrupt request, the address being one of an interrupt vector and a starting address of an interrupt routine associated with the interrupt request;
   outputting the address with the program counter structure via a memory interface with respect to the memory;
   reading in the address from the memory interface;
   comparing the address with a target address assigned to the interrupt request, in order to obtain a comparison result; and
   providing a match signal based on the comparison result.

2. The method as claimed in claim 1, comprising:
   signaling a successful beginning of a processing of the interrupt request by using the match signal.

3. The method as claimed in claim 1, further comprising:
   providing the memory interface with a subsequent address with the program counter structure, the subsequent address logically following the address;
   reading-in the subsequent address; and
   comparing the subsequent address with a subsequent target address that logically follows the target address, in order to obtain the comparison result.

4. The method as claimed in claim 1, further comprising:
   monitoring a handling of the interrupt request by using the match signal.

5. The method as claimed in claim 1, wherein a computer program is configured to perform the method.

6. The method as claimed in claim 5, wherein the computer program is stored on a machine readable storage medium.

7. An apparatus for protecting a program counter structure of a processor system in case of an interrupt request, the processor system comprising at least the program counter structure, an interrupt control device, and a memory, the interrupt control device configured to respond to the interrupt request by providing the program counter structure with an address associated with the interrupt request, the address being one of an interrupt vector and a starting address of the interrupt routine associated with the interrupt request, and the program counter structure configured to output the address to a memory interface with respect to the memory, the apparatus comprising:
   an interface configured to read in the address from the memory interface;
   a comparing device configured to compare the address with a target address assigned to the interrupt request, in order to obtain a comparison result; and
   an outputting device configured to provide a match signal based on the comparison result.

8. A processor system comprising:
   at least an interrupt control device;
   a program counter structure;
   a memory; and
   an apparatus configured to protect the program counter structure in case of an interrupt request, the apparatus including an interface, a comparing device, and an outputting device,
   wherein the interrupt control device is configured to respond to the interrupt request by providing the program counter structure with an address associated with the interrupt request, the address being one of an interrupt vector and a starting address of the interrupt routine associated with the interrupt request,
   wherein the program counter structure is configured to output the address to a memory interface with respect to the memory,
   wherein the interface of the apparatus is configured to read in the address from the memory interface,
   wherein the comparing device is configured to compare the address with a target address assigned to the interrupt request, in order to obtain a comparison result, and
   wherein the outputting device is configured to provide a match signal by using a comparison result of the comparison.

9. The processor system as claimed in claim 8, wherein the program counter structure is part of a processor core, which along with the program counter structure comprises at least an electronic arithmetic and logic unit.

10. The processor system as claimed in claim 9, wherein the processor system is realized as an integrated circuit.

* * * * *